United States Patent
Kidokoro et al.

(10) Patent No.: US 6,422,107 B1
(45) Date of Patent: Jul. 23, 2002

(54) TRANSMISSION BREATHER SYSTEM

(75) Inventors: Teruhisa Kidokoro; Yoshinobu Edure; Shigeru Koyama; Hiroyuki Makino, all of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 88 days.

(21) Appl. No.: 09/688,176

(22) Filed: Oct. 16, 2000

(30) Foreign Application Priority Data

Oct. 18, 1999 (JP) .......................................... 11-295420

(51) Int. Cl.[7] .......................... B01D 46/00; F16H 57/02
(52) U.S. Cl. ................. 74/473.3; 74/606 R; 74/473.36; 74/473.24
(58) Field of Search ................. 74/473.3, 473.36, 74/473.37, 473.24, 606 R, 606 A, 337.5, 477; 55/385.4, 419

(56) References Cited

U.S. PATENT DOCUMENTS

| | | | | |
|---|---|---|---|---|
| 1,639,670 A | * | 8/1927 | Rydner .......................... 55/419 |
| 4,151,761 A | * | 5/1979 | Nishikawa et al. ......... 74/606 A |
| 4,446,755 A | | 5/1984 | Takahashi |
| 4,554,844 A | * | 11/1985 | Hamano .................... 74/606 R |
| 4,987,795 A | * | 1/1991 | Nguyen ..................... 74/606 R |
| 5,129,422 A | * | 7/1992 | Davison, Jr. et al. . 74/606 R X |
| 5,186,066 A | * | 2/1993 | Pandratz et al. ........... 74/477 X |
| 5,222,404 A | * | 6/1993 | Stine .......................... 74/477 X |
| 5,509,949 A | * | 4/1996 | Gluys et al. ........... 74/606 R X |
| 5,566,579 A | * | 10/1996 | Willford et al. ........ 74/473.3 X |
| 5,724,864 A | * | 3/1998 | Rodgers et al. ............ 74/606 R |
| 5,914,415 A | * | 6/1999 | Tago .......................... 55/385.4 |
| 6,015,444 A | * | 1/2000 | Craft et al. ............. 55/385.4 X |
| 6,058,969 A | * | 5/2000 | Bollwahn et al. ...... 74/606 R X |

FOREIGN PATENT DOCUMENTS

FR 2675886 * 4/1991

* cited by examiner

Primary Examiner—David A. Bucci
Assistant Examiner—Colby Hansen
(74) Attorney, Agent, or Firm—Arent Fox Kintner Plotkin & Kahn, PLLC

(57) ABSTRACT

A transmission breather system is provided in which a subassembly is formed by supporting a shift select shaft, moving in the axial direction according to a select operation of a shift lever, and a select spring, maintaining the shift select shaft in a neutral position, on a cover member. Moreover, a breather chamber is formed between the cover member and an indentation of a transmission case by inserting the shift select shaft into an opening formed on the bottom wall of the indentation of the transmission case to connect the cover member to the transmission case, and the select spring is housed in the breather chamber. Thus, with regard to the transmission breather system, it is possible to form a breather chamber whose maintenance is easy while avoiding an increase in the size of the transmission case.

2 Claims, 12 Drawing Sheets

FIRST SPEED-SECOND SPEED SELECT POSITION

THIRD SPEED-FOURTH SPEED SELECT POSITION

FIRST SPEED-SECOND SPEED SELECT POSITION

TRANSMISSION BREATHER SYSTEM

BACKGROUND OF THE INVENTION

1. Field of the Invention

The present invention relates to a breather system for a transmission in which a plurality of gear shift stages are selectively established by moving shift forks by means of a shift select shaft, moving in an axial direction according to a select operation of a shift lever and moving in a circular manner according to the shift operation thereof.

2. Description of the Prior Art

A transmission containing a breather chamber is known in U.S. Pat. No. 4,446,755. This breather chamber is formed from a rib which is connected to the inner wall surface of a transmission case and a rib which is connected to the inner wall surface of a clutch case, to bridge the connecting surface between the two cases, and the breather chamber is connected through to the internal space of the transmission case via a notch formed in the rib.

However, since a special breather chamber is formed on the connecting surface between the transmission case and the clutch case in the prior art, not only does the overall size of the transmission increase due to the volume of the breather chamber, but also maintenance of the breather chamber cannot be carried out without separating the transmission case from the clutch case, which is an extremely troublesome operation.

SUMMARY OF THE INVENTION

The present invention has been carried out in view of the above-mentioned circumstances, and it is an objective of the present invention to form a breather chamber whose maintenance is easy while avoiding an increase in the size of the transmission case.

In order to achieve the above-mentioned objective, in accordance with the present invention a transmission breather system is provided which is a breather system for a transmission in which a plurality of gear shift stages are selectively established by moving shift forks by means of a shift select shaft, moving in the axial direction according to a select operation of a shift lever and moving in a circular manner according to a shift operation thereof. A subassembly is formed by supporting the shift select shaft and a select spring, which maintains the shift select shaft in a neutral position, on a cover member. A breather chamber is formed between the cover member and an indentation formed in a transmission case by inserting the shift select shaft into an opening formed on the bottom wall of the indentation of the transmission case so as to connect the cover member to the transmission case, and the select spring is housed in the breather chamber.

In accordance with the above-mentioned arrangement, since the subassembly is made by supporting the shift select shaft and the select spring on the cover member and the shift select shaft of the subassembly is inserted into the opening formed on the bottom wall of the indentation of the transmission case to connect the cover member to the transmission case, not only does the operation of assembling the shift select shaft and the select spring become easy, but also the space required for housing the select spring can be used as the breather chamber, contributing to a reduction in the size of the transmission case. Moreover, maintenance can be carried out by simply removing the subassembly from the transmission case to expose the internal space of the breather chamber.

Furthermore, in accordance with the present invention, a breather system for a transmission is proposed wherein a spring seat for supporting one end of the select spring is supported on the bottom wall of the indentation, and the breather chamber is connected through to the internal space of the transmission case via a through hole which is formed between the outer circumference of the spring seat and the inner circumference of the opening.

In accordance with the above-mentioned arrangement, since the breather chamber is connected through to the internal space of the transmission case via the through hole between the outer circumference of the spring seat for supporting one end of the select spring and the inner circumference of the opening of the transmission case, it is possible to prevent oil inside the transmission case from entering the breather chamber.

DETAILED DESCRIPTION OF THE PREFERRED EMBODIMENT

Figure 1:
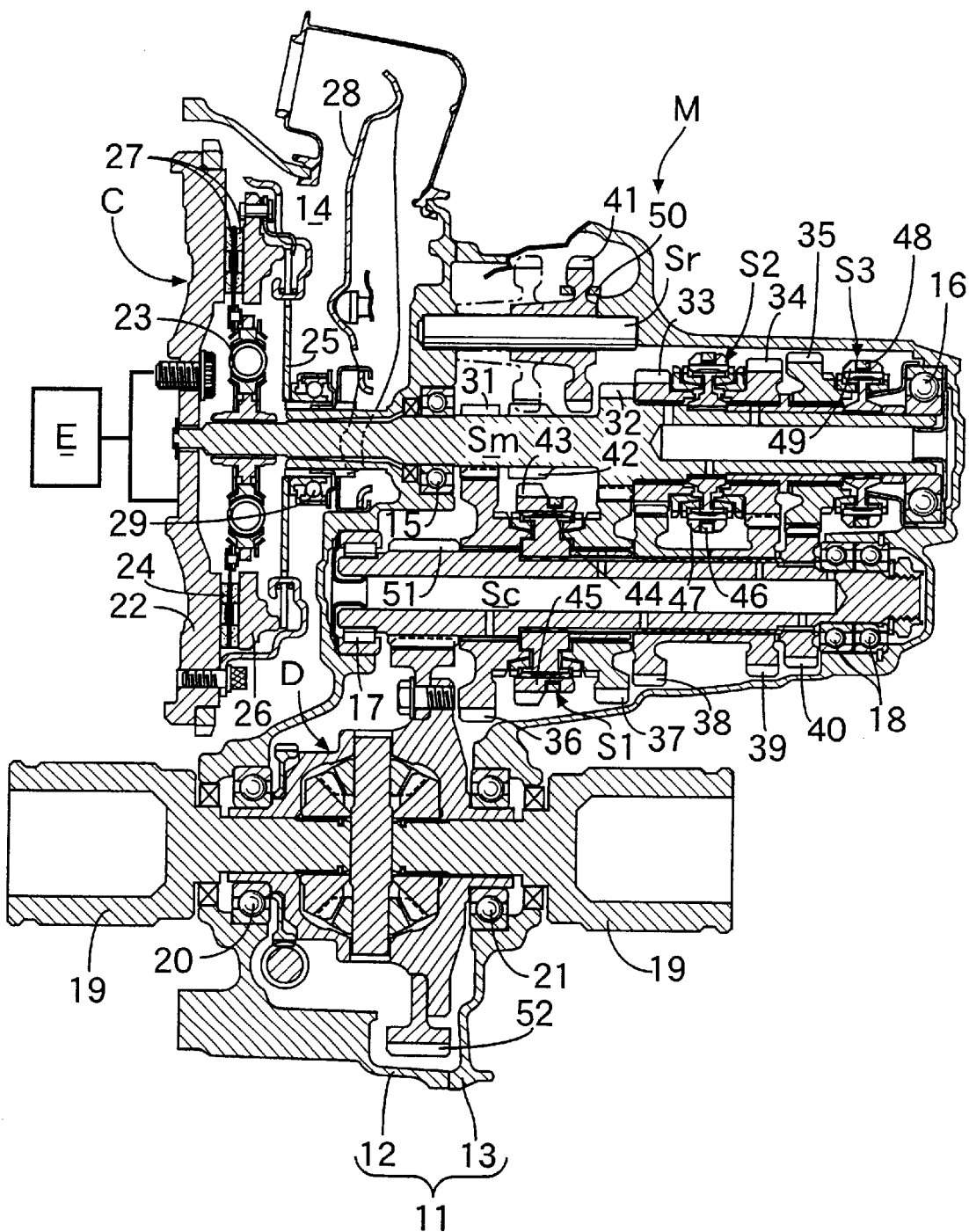
FIG. 1 is a vertical cross-sectional view of a manual transmission for a vehicle.

As shown in FIG. 1 a transmission case 11 for a manual transmission M for vehicle with five forward speeds and one reverse speed, comprises a case left half 12 and a case right half 13 which are separated on a dividing plane extending in the longitudinal direction of the vehicle, and a gear shift clutch C is housed in a clutch chamber 14 formed on the side surface of the case left half 12 on the side of the engine E. The right and left ends of a main shaft Sm connected to the engine E via the gear shift clutch C, are supported by means of ball bearings 16 and 15 on the case right half 13 and the case left half 12 respectively, and the right and left ends of a counter shaft Sc positioned in parallel to the main shaft Sm are supported by ball bearings 18 and roller bearings 17 on the case right half 13 and the case left half 12 respectively. A differential gear D which distributes the output from the counter shaft Sc to the right and left axles 19, 19 is supported by a pair of right and left ball bearings 21, 20 on the case right half 13 and the case left half 12 respectively.

The gear shift clutch C housed inside the clutch chamber 14, comprises a clutch wheel 22 which is connected to the right end of the crankshaft of the engine E and a clutch disc 24, connected to the left end of the main shaft Sm via a damper 23. They are normally engaged by clamping the facings 27 of the clutch disc 24 between a pressure plate 26 and the clutch wheel 22 by means of the resilient force of a diaphragm spring 25 and the engagement is released during gear shifting by means of a release fork 28 pushing a release bearing 29 leftwards.

On the main shaft Sm are secured a main first speed gear 31, a main second speed gear 32, a main third speed gear 33, a main fourth speed gear 34 and a main fifth speed gear 35, which are all supported in a relatively rotatable manner. On the counter shaft Sc, a counter first speed gear 36 and a counter second speed gear 37 which mesh with the main first speed gear 31 and main second speed gear 32, are supported in a relatively rotatable manner. A counter third speed gear 38, a counter fourth speed gear 39 and a counter fifth speed gear 40 are also secured with counter shaft Sc and mesh with the main third speed gear 33, main fourth speed gear 34 and main fifth speed gear 35 respectively.

The right and left ends of a reverse idle shaft Sr are supported on the case right half 13 and the case left half 12, and a reverse idle gear 41 which is supported on the reverse idle shaft Sr, in a laterally slidable manner, can mesh with a main reverse gear 42 which is secured on the main shaft Sm as well as with a counter reverse gear 43 which is supported on the counter shaft Sc in a relatively rotatable manner.

By moving a sleeve 45 of a first speed–second speed synchronous mechanism S1 leftwards by means of a first speed–second speed shift fork 44, the counter first speed gear 36 is connected to the counter shaft Sc to establish a first speed gear shift stage, and by moving the sleeve 45 of the first speed–second speed synchronous mechanism S1 rightwards by means of the first speed–second speed shift fork 44, the counter second speed gear 37 is connected to the counter shaft Sc to establish a second speed gear shift stage. By moving a sleeve 47 of a third speed–fourth speed synchronous mechanism S2 leftwards by means of a third speed–fourth speed shift fork 46 the main third speed gear 33 is connected to the main shaft Sm to establish a third speed gear shift stage, and by moving the sleeve 47 of the third speed–fourth speed synchronous mechanism S2 rightwards by means of the third speed–fourth speed shift fork 46, the main fourth speed gear 34 is connected to the main shaft Sm to establish a fourth speed gear shift stage.

By moving a sleeve 49 of a fifth speed synchronous mechanism S3 leftwards by means of a fifth speed shift fork 48, the main fifth speed gear 35 is connected to the main shaft Sm to establish a fifth speed gear shift stage. When the sleeve 49 of the fifth speed synchronous mechanism S3 is moved rightwards by means of the fifth speed shift fork 48, a reverse shift fork 50 which supports the reverse idle gear 41 in a rotatable manner, moves leftwards in operative connection with the fifth speed shift fork 48, and the reverse idle gear 41 meshes with the main reverse gear 42 and the counter reverse gear 43 provided on the sleeve 45 of the first speed–second speed synchronous mechanism S1, to establish a reverse gear shift stage.

The first speed–second speed synchronous mechanism S1, the third speed–fourth speed synchronous mechanism S2 and the fifth speed synchronous mechanism S3 are known and they carry out a synchronous action by means of the frictional force between a blocking ring and a synchro cone due to the lateral movement of the sleeves 45, 47 and 49.

When the first to fifth gear shift stage or reverse gear shift stage is thus established, rotation of the counter shaft Sc is transmitted to the differential gear D via a final drive gear 51 and a final driven gear 52 thus driving the right and left axles 19, 19.

The structure of a shifting system for establishing the first speed to fifth speed gear shift stages and the reverse gear shift stage is explained below by reference to FIG. 2 to FIG. 12.

Figure 2:
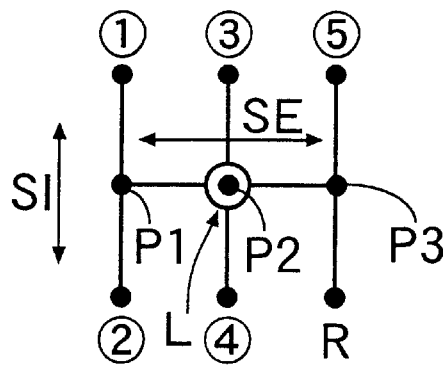
FIG. 2 is a diagram showing the change patterns of a change lever.

FIG. 2 shows an operational pattern of a shift lever L of the shifting system; P1 denotes a first speed–second speed select position, P2 denotes a third speed–fourth speed select position (neutral position), P3 denotes a fifth speed–reverse select position, ① and ② which are located on either side of the first speed–second speed select position P1, denote a first speed position and a second speed position respectively, ③ and ④ which are located on either side of the third speed–fourth speed select position P2, denote a third speed position and a fourth speed position respectively, and ⑤ and R which are located on either side of the fifth speed–reverse select position P3, denote a fifth speed position and a reverse position respectively. The arrow SE in the figure illustrates the directions of the select operation of the shift lever L and the arrow SI in the figure illustrates the directions of the shift operation of the shift lever L.

Figure 3:
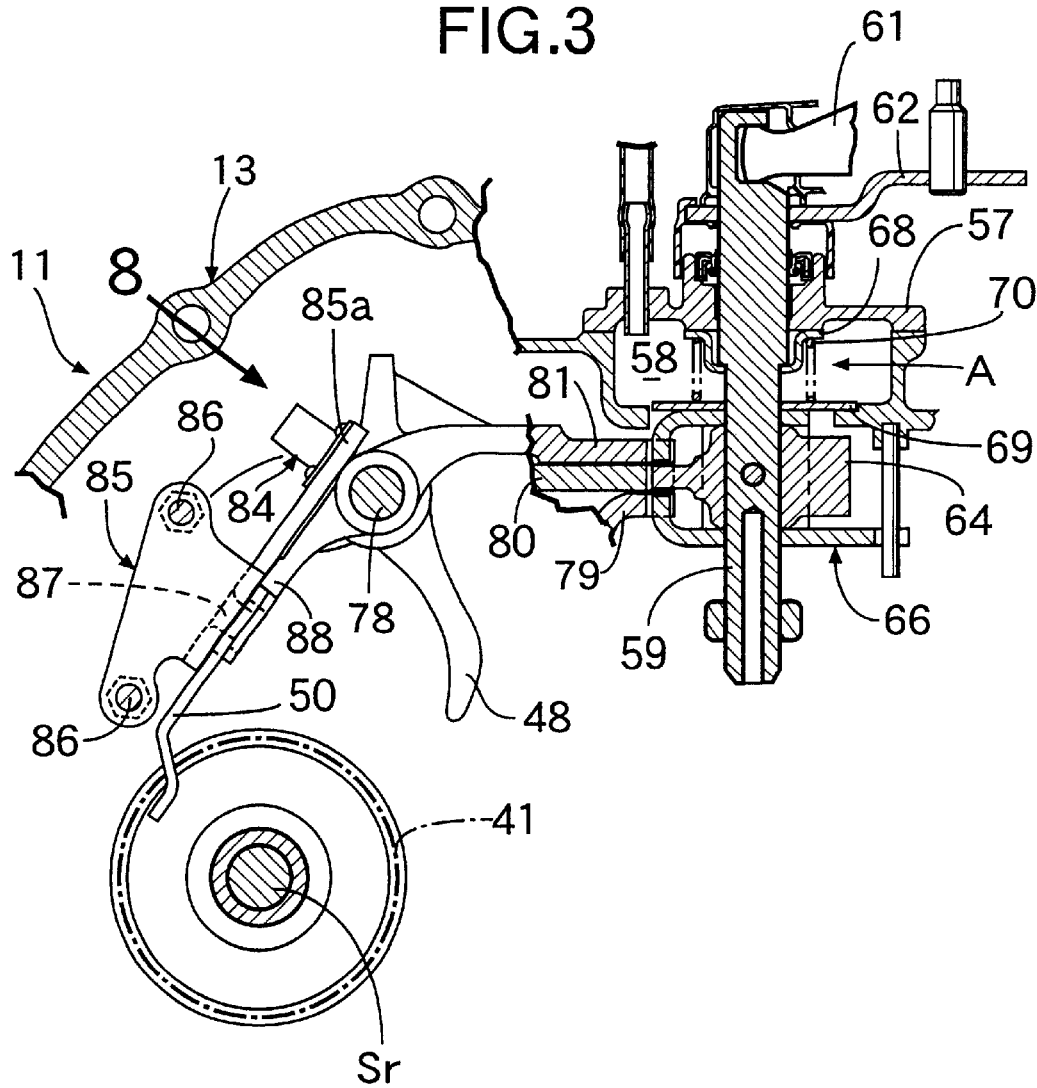
FIG. 3 is a horizontal cross-sectional view of an essential part of the manual transmission for a vehicle.
Figure 4:
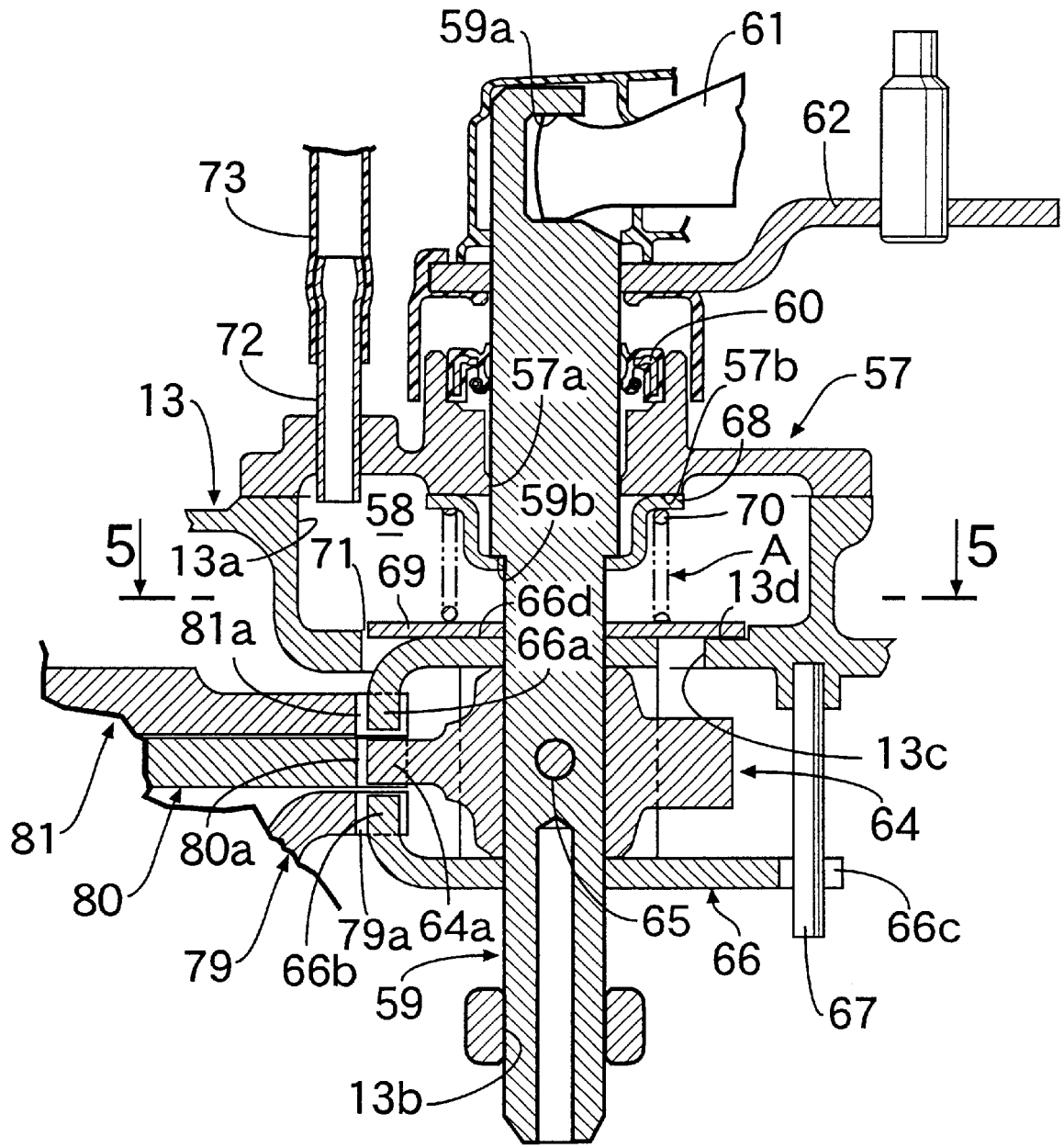
FIG. 4 is a magnified view of an essential part of FIG. 3 (third speed–fourth speed select position).
Figure 5:
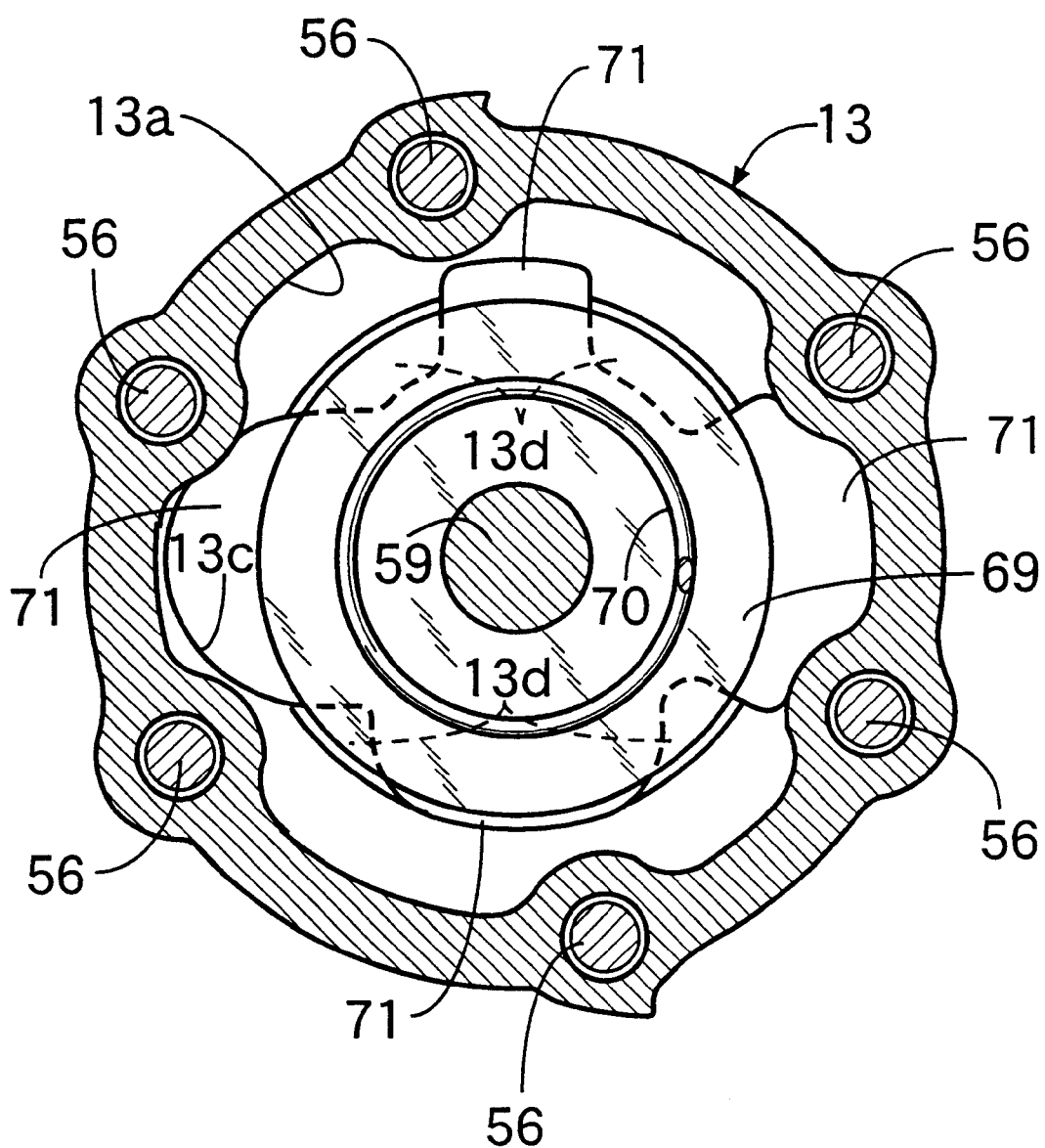
FIG. 5 is a cross-sectional view at line 5—5 in FIG. 4.

As shown in FIG. 3 to FIG. 5, a dish-shaped indentation 13a is formed on the upper part of the case right half 13 of the transmission case 11, and by connecting a cover member 57 by means of six bolts 56 to cover the opening of the indentation 13a, a breather chamber 58 is formed between the cover member 57 and the indentation 13a. A shift select shaft 59 is supported in a rotatably and longitudinally movable manner in a guide hole 57a formed in the center of the cover member 57 and a guide hole 13b formed inside the case right half 13.

A notch 59a is formed on the upper end of the shift select shaft 59 which extends externally from the cover member 57 via a sealing member 60, and a select lever 61 engages with the notch 59a. The select lever 61 swings vertically in operative connection with the select operation (operation in the direction of the arrow SE in FIG. 2) of the shift lever L and can move the shift select shaft 59 between the third speed–fourth speed select position shown in FIG. 4, the fifth speed–reverse select position (see FIG. 6), which is upwards relative to the third speed–fourth speed select position, and the first speed second speed select position (FIG. 7), which is downwards relative to the third speed–fourth speed select position.

Figure 8:
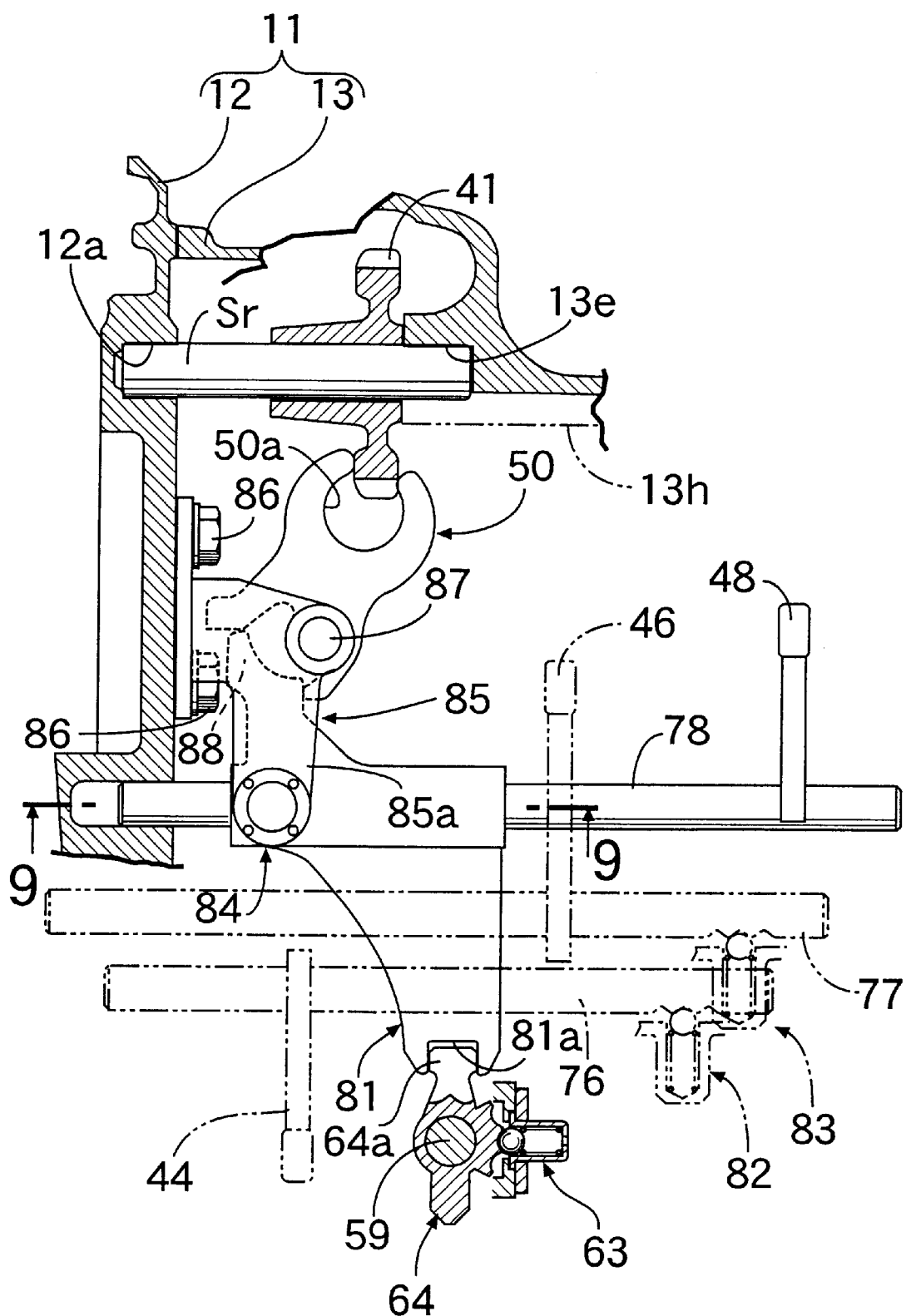
FIG. 8 is a view taken in the direction of an arrow 8 in FIG. 3.

A shift lever 62 is fixed beneath the notch 59a of the shift select shaft 59, and the shift lever 62 rotates in lateral directions in operative connection with the shift operation (operation in the direction of the arrow SI in FIG. 2) of the shift lever L. When the shift lever L is in the first speed–second speed select position P1, the third speed–fourth speed select position P2 or the fifth speed–reverse select position P3, the shift select shaft 59 is in the neutral position; when the shift lever L is operated to move to the first speed position ①, the third speed position ③ or the fifth speed position ⑤, the shift select shaft 59 rotates leftwards from the neutral position, and when the shift lever L is operated to move to the second speed position ②, the fourth speed position ④ or the reverse position R, the shift select shaft 59 rotates rightwards from the neutral position. The shift select shaft 59 can be stopped at nodal points in the three rotational positions by means of a detent mechanism 63 (FIG. 8).

A shift arm 64 is fixed by a fixing pin 65 on the shift select shaft 59 which extends inside the case right half 13, and an interlock plate 66 is also supported on the shaft 59 in a relatively rotatable manner such that the shift arm 64 is vertically sandwiched by the plate 64. The interlock plate 66 comprises a pair of upper and lower lock claws 66a, 66b, and the pair of lock claws 66a, 66b face the top and bottom respectively of a drive part 64a formed at the forward end of the shift arm 64. The interlock plate 66 comprises a guide channel 66c which extends in a direction perpendicular to the shift select shaft 59 and a rotation stopping pin 67 fixed on the case right half 13 engages with the guide channel 66c.

Therefore, when the shift select shaft 59 moves vertically, the shift arm 64 and the interlock plate 66 ascend and descend together, but when the shift select shaft 59 rotates, the shift arm 64 rotates together with the shift select shaft 59, but rotation of the interlock plate 66 is restricted by engagement of the guide channel 66c with the rotation stopping pin 67.

The shift select shaft 59 has a lower half with a smaller diameter beneath a step-shaped first stopper surface 59b which is formed almost at its center in the longitudinal direction, and the upper surface of the inner circumference of a first spring seat 68 which fits in a slidable manner on the lower half of the shift select shaft 59 having the smaller diameter, engages with the first stopper surface 59b from the lower side, whereas the upper surface of the outer circumference of the first spring seat 68 is in contact with a first support surface 57b which is a lower surface of the cover member 57. With regard to a disc-shaped second spring seat 69 which is placed beneath the first-spring seat 68 and fits in a slidable manner on the shift select shaft 59, the lower surface of the inner circumference thereof engages with a second stopper surface 66d which is formed on the upper surface of the interlock plate 66. A roughly cross-shaped opening 13c is formed on the bottom wall of the indentation 13a of the case right half 13, and the lower surface of the outer circumference of the second spring seat 69 is supported by four step-shaped second supporting surfaces 13d which are formed on the edge of the opening 13c. The upper and lower ends of a select spring 70 are supported between the lower surface of the first spring seat 68 and the upper surface of the second spring seat 69.

Thus, when the shift select shaft 59 is in the three speed–fourth speed select position shown in FIG. 4, the upper surface of the inner circumference of the first spring seat 68 and the lower surface of the inner circumference of the second spring seat 69 which are supported in a slidable manner on the shift select shaft 59 and are forced by the select spring 70 in a direction such that they move apart from each other, are resiliently in contact with both the first stopper surface 59b of the shift select shaft 59 and with the second stopper surface 66d formed on the upper surface of the interlock plate 66, and the upper surface of the outer circumference of the first spring seat 68 and the lower surface of the outer circumference of the second spring seat 69 are supported by being in contact with the first support surface 57b of the cover member 57 and with the second support surfaces 13d of the indentation 13a respectively, and the shift select shaft 59 thus stops in a stable manner at the third speed–fourth speed select position.

When the shift select shaft 59 moves upwards from the above-mentioned state to the fifth speed–reverse select position (FIG. 6), since the second spring seat 69 which is pressed by the second stopper surface 66d of the interlock plate 66 which is integral with the shift select shaft 59, ascends while leaving the first spring seat 68 which is latched onto the first support surface 57b of the cover member 57 at its original position, the select spring 70 is compressed, generating a force to return the shift select shaft 59 to the third speed–fourth speed select position.

On the other hand, when the shift select shaft 59 moves downwards from the third speed–fourth speed position to the first speed–second speed select position (FIG. 7), since the first spring seat 68 which is pressed by the first stopper surface 59b of the shift select shaft 59, descends while leaving the second spring seat 69 which is latched onto the second support surfaces 13d of the opening 13c, at its original position, the select spring 70 is compressed, generating a force to return the shift select shaft 59 to the third speed–fourth speed select position.

As hereinbefore described, since the shift select shaft 59 can be centered by forcing it to the third speed–fourth speed select position, which is the neutral position, by means of just one select spring 70, in comparison with the case in which the shift select shaft 59 is forced upwards and downwards by means of two springs, the number of parts and the cost can be reduced. Moreover, when two springs are supported on the shift select shaft 59, the length of the shift select shaft 59 inevitably increases, but by using only one spring it is possible to reduce the overall length of the shift select shaft 59.

The internal space of the breather chamber 58 which is defined by the indentation 13a of the case right half 13 and the cover member 57 is connected to the internal space of the transmission case 11 via four through holes 71 which are formed between the inner circumference of the opening 13c and the outer circumference of the second spring seat 69 and is connected to the outside of the transmission case 11 via a breather tube 73 provided on the forward end of a breather pipe 72, which is integral with the cover member 57.

A subassembly A is formed by assembling the shift select shaft 59, the first spring seat 68, the second spring seat 69, the select spring 70, the shift arm 64, the fixing pin 65 and the interlock plate 66 beforehand, onto the cover member 57, and by inserting this subassembly. A into the opening 13c through the indentation 13a of the case right half 13 during assembly. Thus, the assembly operation can be outstandingly enhanced.

Since the breather chamber 58 is defined by the indentation 13a of the case right half 13 and the cover member 57, and the first spring seat 68, the second spring seat 69 and the select spring 70 are housed inside the breather chamber 58, a single space functions as both the space forming the breather chamber 58 and the space for housing the first spring seat 68, the second spring seat 69 and the select spring 70, and it is possible to avoid an increase in the size of the transmission case 11 and the number of parts. Moreover, since the breather chamber 58 is connected to the internal space of the transmission case 11 via the four through holes 71 which are formed between the inner circumference of the opening 13c and the outer circumference of the second spring seat 69, and the shift arm 64 and the interlock plate 66 are positioned so as to adjoin each other beneath the through holes 71, oil can be effectively prevented from entering the breather chamber 58 due to the labyrinth effect.

As shown in FIG. 4 and FIG. 8, the two ends of a first speed–second speed shift rod 76 comprising the first speed–second speed shift fork 44, the two ends of a third speed–fourth speed shift rod 77 comprising the third speed–fourth speed shift fork 46 and the two ends of a fifth speed–reverse shift rod 78 comprising the fifth speed shift fork 48 are supported in a slidable manner on the case left half 12 and the case right half 13 respectively. A first speed–second speed shift piece 79, a third speed–fourth speed shift piece 80 and a fifth speed–reverse shift piece 81 are fixed on the first speed–second speed shift rod 76, the third speed–fourth speed shift rod 77 and the fifth speed–reverse shift rod 78 respectively, and notches 79a, 80a, 81a formed at the forward ends of the three shift pieces 79, 80, 81 respectively are aligned vertically so that they can selectively engage with the drive part 64a provided at the forward end of the shift arm 64.

Thus, when the shift select shaft 59 is in the third speed–fourth speed select position as shown in FIG. 4, since the drive part 64a of the shift arm 64 engages with the notch 80a of the third speed–fourth speed shift piece 80, the third speed–fourth speed shift rod 77 can be driven together with the third speed–fourth speed shift piece 80 from the neutral position to the third speed position or the fourth speed position by a circular movement of the shift select shaft 59. At this stage, the locking claw 66b on the lower side of the interlock plate 66 engages with the notch 79a of the first speed–second speed shift piece 79, and the locking claw 66a on the upper side of the interlock plate 66 engages with the notch 81a of the fifth speed–reverse shift piece 81, and thus malfunctions of the first speed–second speed shift piece 79 and the fifth speed–reverse shift piece 81 can be prevented.

Figure 7:
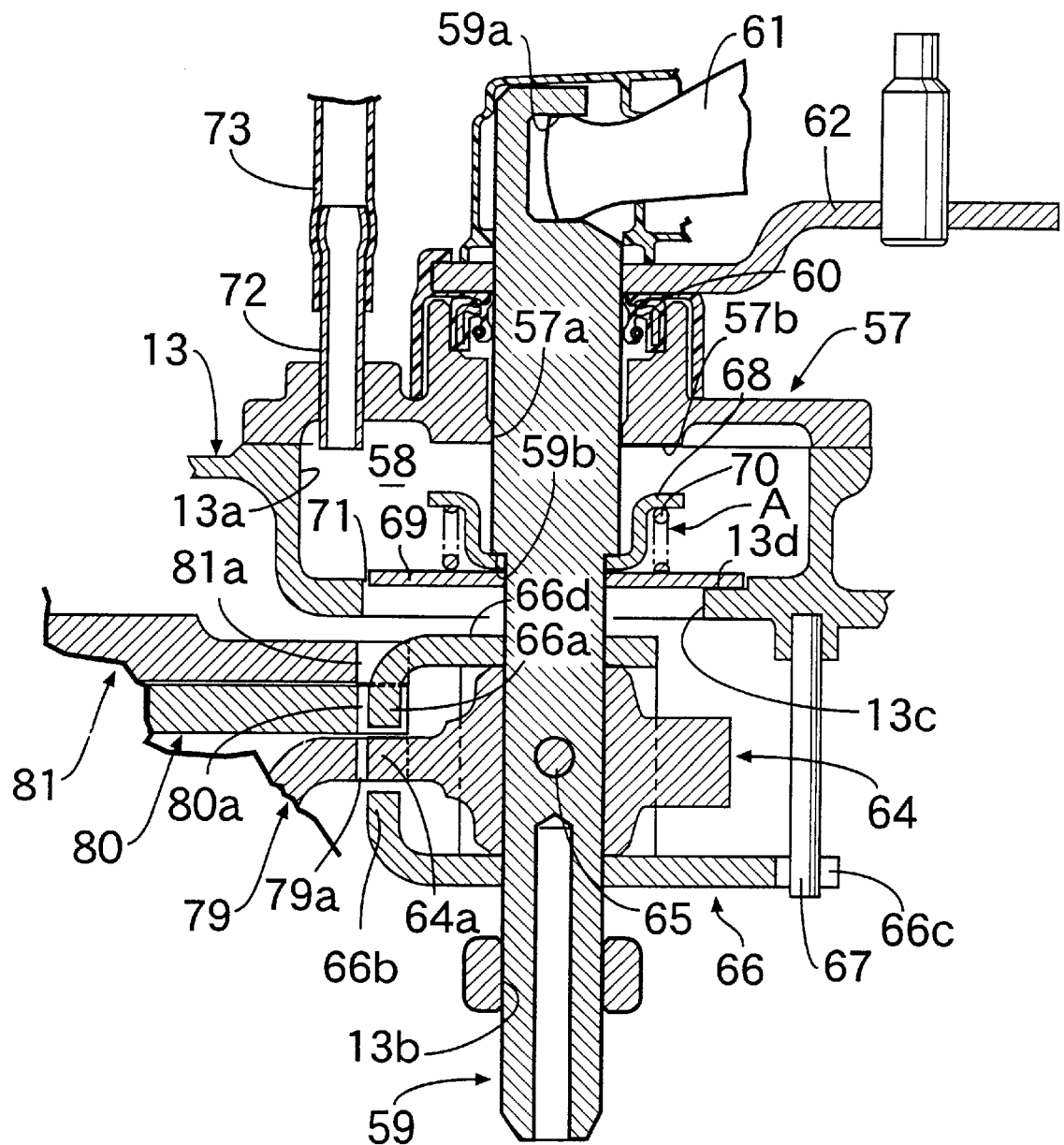
FIG. 7 is a view for explaining an action corresponding to FIG. 4 (first speed–second speed select position).

As shown in FIG. 7, when the shift select shaft 59 is moved to the first speed–second speed select position which is beneath the third speed–fourth speed select position, since the drive part 64a of the shift arm 64 engages with the notch 79a of the first speed–second speed shift piece 79, the first speed–second speed shift rod 76 can be driven together with the first speed–second speed piece 79 from the neutral position to the first speed position or the second speed position by a circular movement of the shift select shaft 59. At this stage, the locking claw 66a on the upper side of the interlock plate 66 engages with the notch 81a of the fifth speed–reverse shift piece 81 and the notch 80a of the third speed–fourth speed shift piece 80, and thus malfunctions of the fifth speed–reverse shift piece 81 and the third speed–fourth speed shift piece 80 can be prevented.

Figure 6:
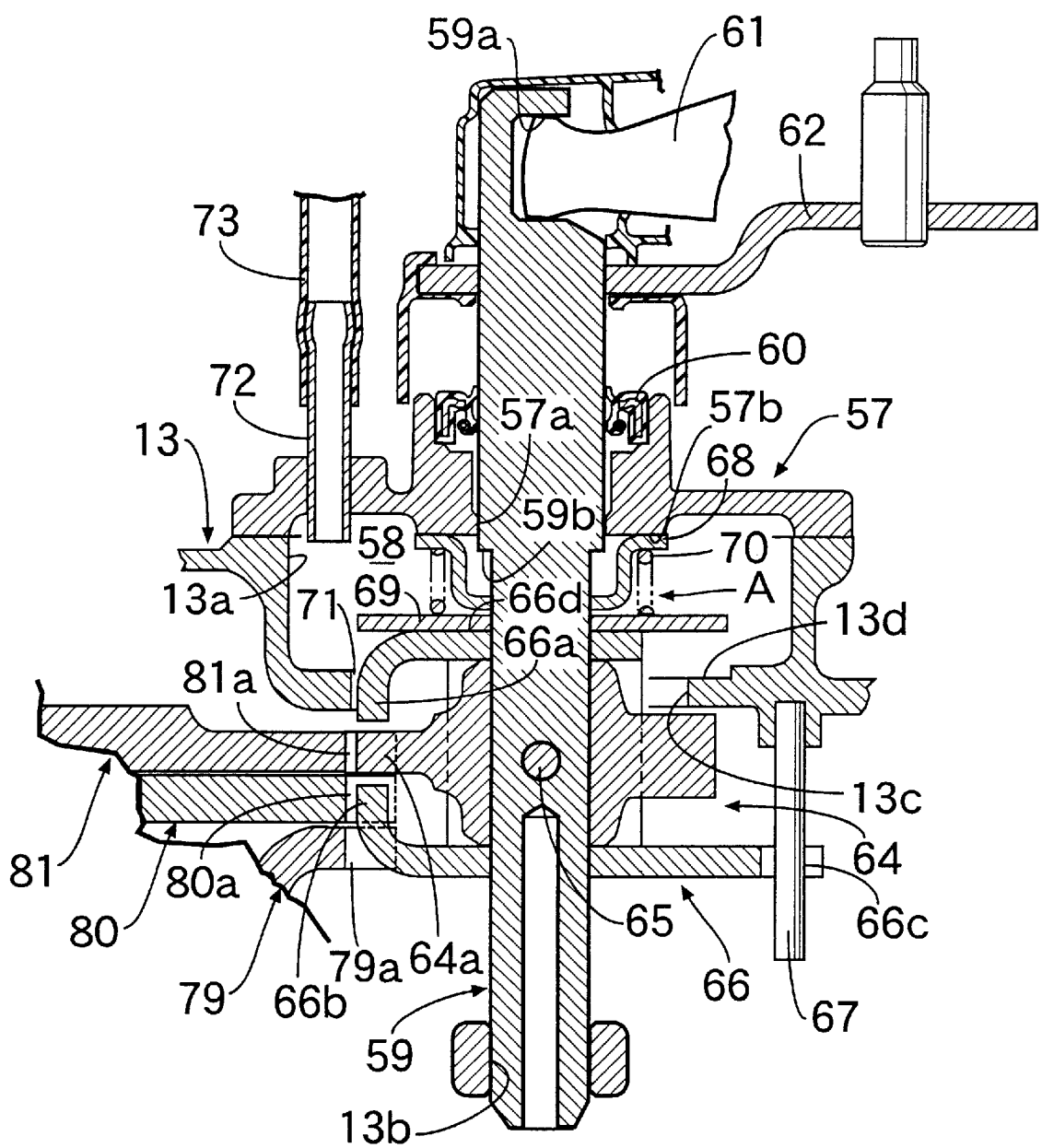
FIG. 6 is a view for explaining an action corresponding to FIG. 4 (fifth speed–reverse select position).

As shown in FIG. 6, when the shift select shaft 59 is moved to the fifth speed–reverse select position which is above the third speed–fourth speed select position, since the drive part 64a of the shift arm 64 engages with the notch 81a of the fifth speed–reverse shift piece 81, the fifth speed–reverse shift rod 78 can be driven together with the fifth speed–reverse shift piece 81 from the neutral position to the fifth speed position or the reverse position by a circular movement of the shift select shaft 59. At this stage, the locking claw 66b on the lower side of the interlock plate 66 engages with the notch 79a of the first speed–second speed shift piece 79 and the notch 80a of the third speed–fourth speed shift piece 80, and thus malfunctions of the first speed–second speed shift piece 79 and the third speed–fourth speed shift piece 80 can be prevented.

As shown in FIG. 8, a detent mechanism 82 is provided in order to stop the first speed–second speed shift rod 76 at nodal points so as to correspond to the first speed–second speed select position, the first speed position and the second speed position. Moreover, a detent mechanism 83 is provided in order to stop the third speed–fourth speed shift rod 77 at nodal points so as to correspond to the third speed–fourth speed select position, the third speed position and the fourth speed position.

Figure 9:
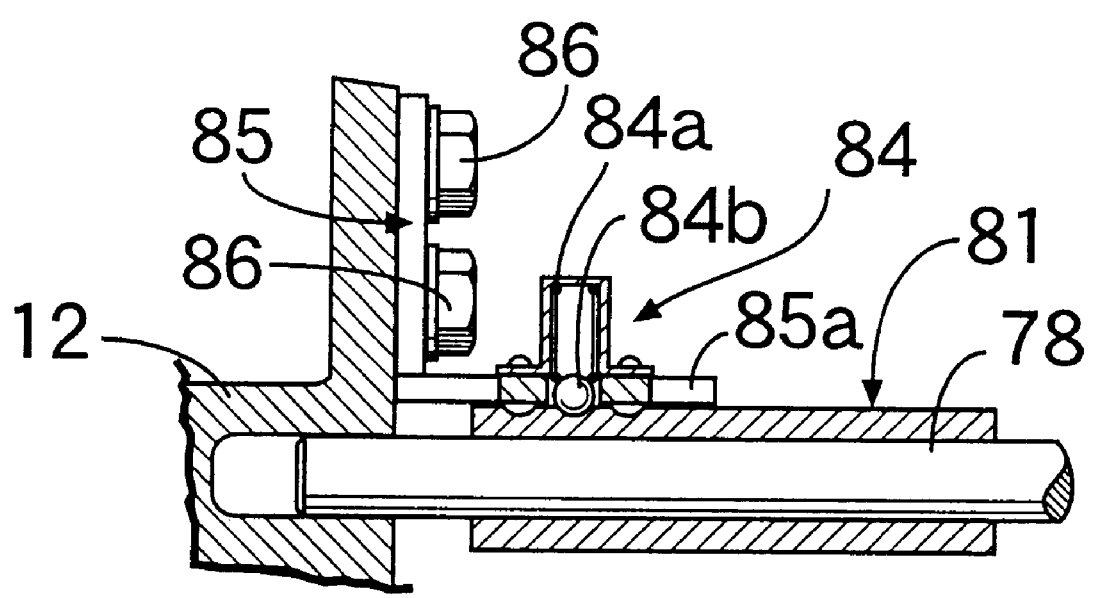
FIG. 9 is a cross-sectional view at line 9—9 in FIG. 8.
Figure 10:
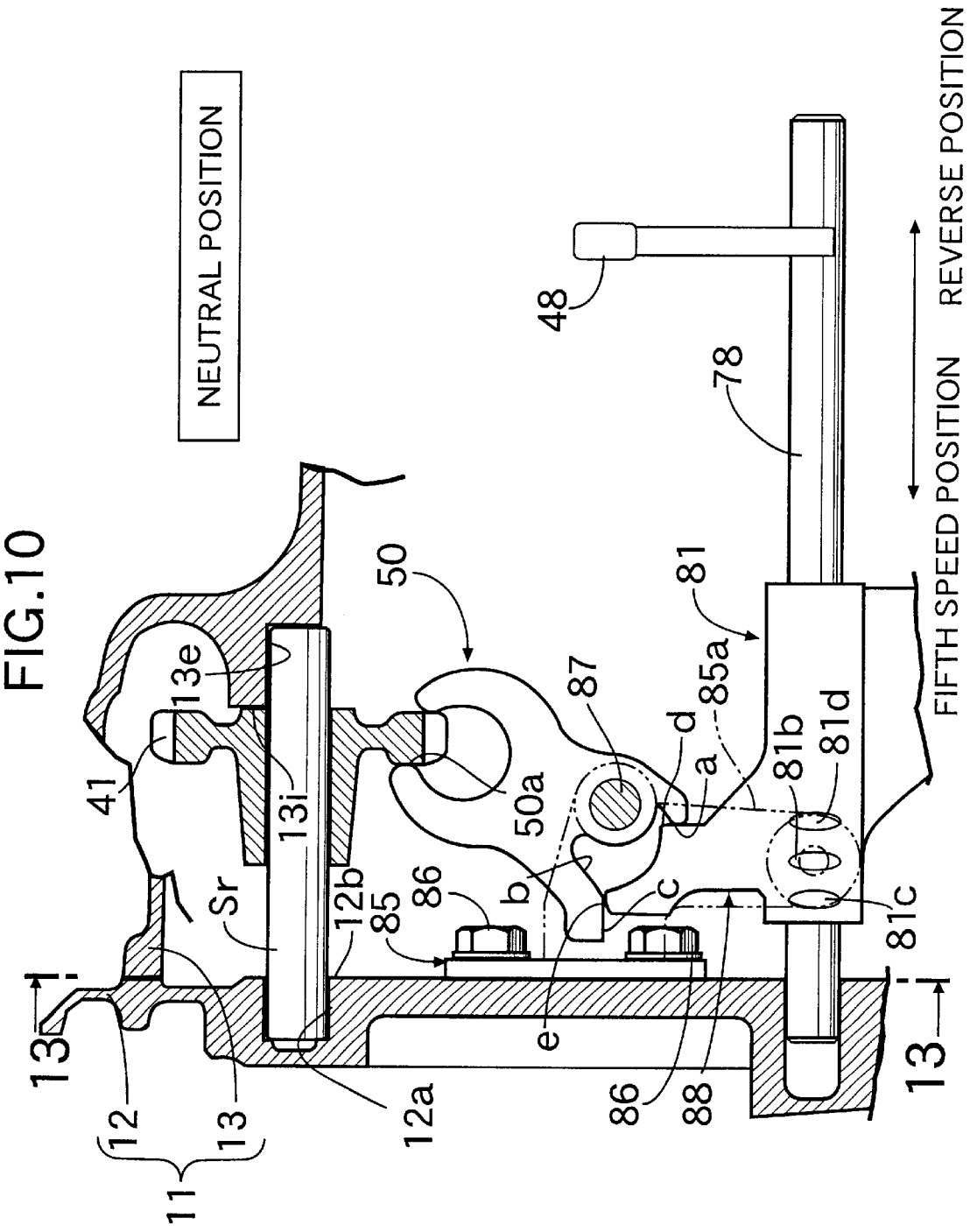
FIG. 10 is a magnified view of an essential part of FIG. 8 (neutral position).

As shown in FIG. 8 to FIG. 10, a bracket 85 is fixed to the inner surface of the case right half 13 by means of two bolts 86, 86, and the reverse shift fork 50 is supported in a swingable manner on the bracket 85 via a fulcrum pin 87. A notch 50a which is interposed between the two side surfaces of the reverse idle gear 41 is formed at one end of the reverse shift fork 50 and a driven cam face a for reverse shift, a driven cam face b for neutral return and a driven cam face c for neutral hold are formed continuously at the other end, relative to the fulcrum pin 87, of the reverse shift fork 50. A drive cam face d for reverse shift which can come into contact with the driven cam face c for reverse shift and a drive cam face e for neutral return which can come into contact with the driven cam face b for neutral return and the driven cam face c for neutral hold, are formed continuously at the forward end of the drive cam 88, which is formed integrally with the fifth speed–reverse shift piece 81.

A detent mechanism 84 for stopping the fifth speed–reverse shift rod 78 at nodal points to correspond to the fifth speed–reverse select position, the fifth speed position and the reverse position is provided at the forward end of an arm 85a which extends integrally from the bracket 85 supporting the reverse shift fork 50. As shown in FIG. 9, the detent mechanism 84 comprises a detent ball 84b which is urged by a detent spring 84a, and this detent ball 84b can selectively engage with three indentations 81b to 81d (FIG. 10 to FIG. 12) which are formed on the fifth speed–reverse shift piece 81.

Thus, when the fifth speed–reverse shift piece 81 is at the neutral position as shown in FIG. 10, the drive cam face d for reverse shift and the drive cam face e for neutral return of the drive cam 88 of the fifth speed–reverse shift piece 81 are in contact with the driven cam face a for reverse shift and the driven cam face c for neutral hold of the reverse shift fork 50 respectively, and the reverse idle gear 41 is at the neutral position which is at the right end on the reverse idle shaft Sr and is in contact with the end face 13i of the case right half 13. Therefore, even if the reverse idle gear 41 attempts to move leftwards so as to move away from the end face 13i of the case right half 13, the leftward movement of the reverse idle gear 41 is prevented by the contact between the drive cam face e for neutral return of the drive cam 88 and the driven cam face c for neutral hold of the reverse shift fork 50.

Figure 12:
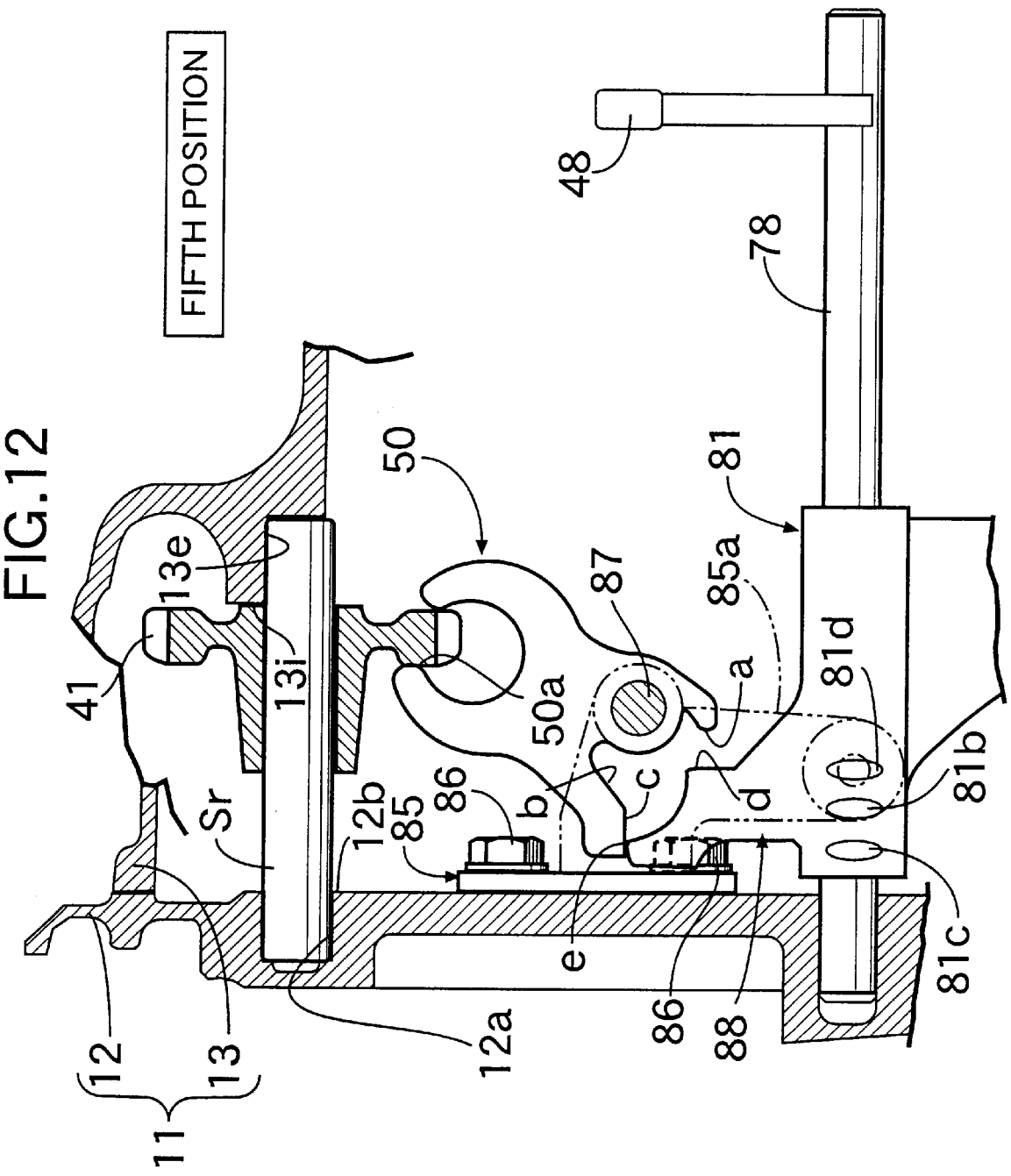
FIG. 12 is a view for explaining an action corresponding to FIG. 10 (fifth speed position).

As shown in FIG. 12, when the fifth speed–reverse shift rod 78 moves leftwards from the neutral position to the fifth speed position in order to establish a fifth speed gear shift stage, the main fifth speed gear 35 is linked to the main shaft Sm by the fifth speed shift fork 48, which is provided on the fifth speed–reverse shift rod 78, to establish the fifth speed gear shift stage (FIG. 1). At this stage, the drive cam face e for neutral return of the drive cam 88 which operates integrally with the fifth speed–reverse shift rod 78 moves to slide along the driven cam face c for neutral hold of the reverse shift fork 50, and the reverse shift fork 50 remains stopped at the neutral position. In this case also, even if the reverse idle gear 41 attempts to move leftwards so as to move away from the end face 13i of the case right half 13, the leftward movement of the reverse idle gear 41 is prevented by the contact between the drive cam face e for neutral return of the drive cam 88 and the driven cam face c for neutral hold of the reverse shift fork 50.

When the fifth speed–reverse shift rod 78 moves rightwards from the fifth position (FIG. 11) to the neutral position (FIG. 10) in order to release an established fifth gear shift stage, since the drive cam face e for neutral return of the drive cam 88 moves to slide along the driven cam face c for neutral hold of the reverse shift fork 50, the reverse shift fork 50 remains stopped at the neutral position.

Figure 11:
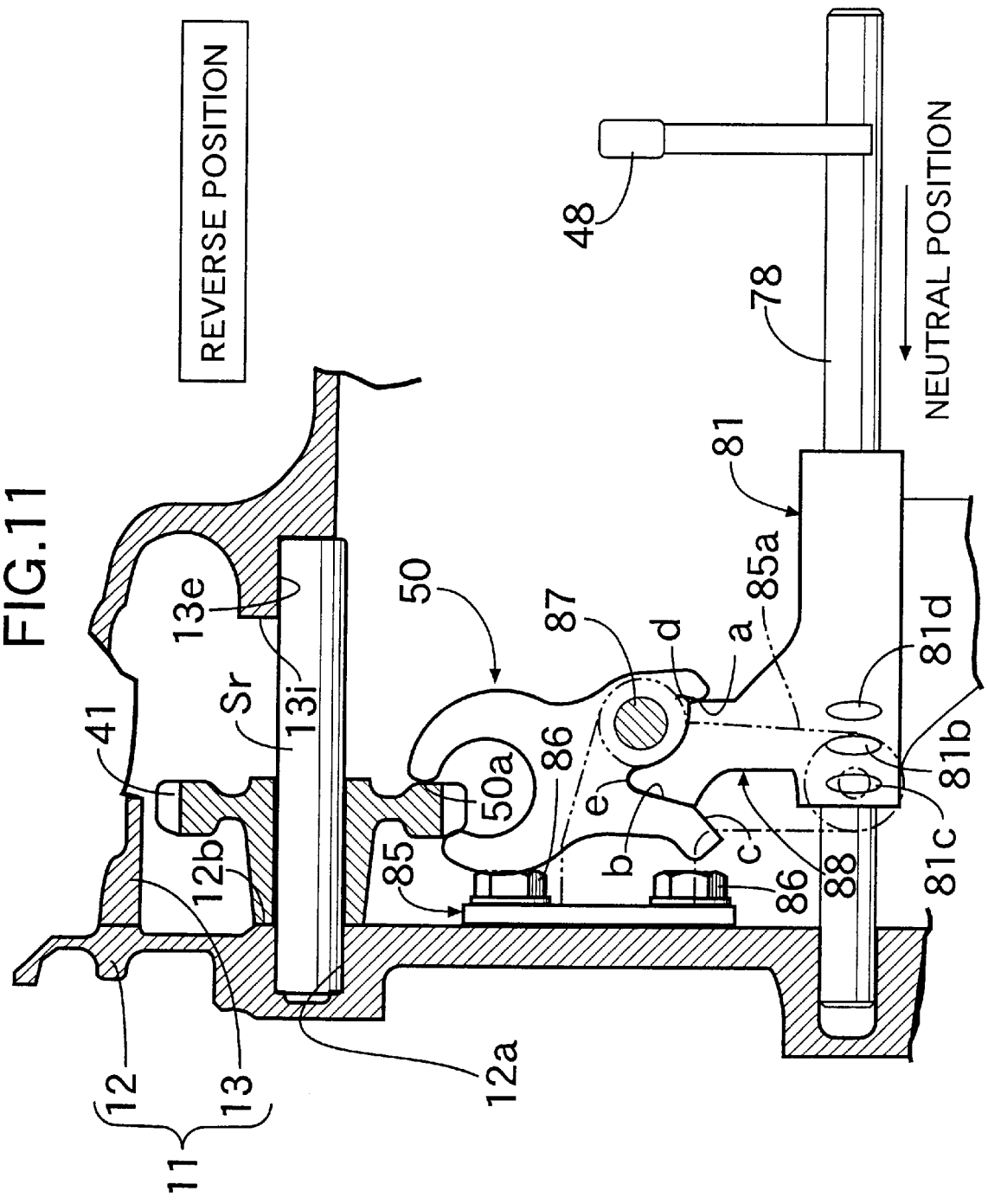
FIG. 11 is a view for explaining an action corresponding to FIG. 10 (reverse position).

As shown in FIG. 11, when the fifth speed–reverse shift rod 78 moves rightwards from the neutral position to the reverse position in order to establish a reverse gear shift stage, the fifth speed shift fork 48 provided on the fifth speed–reverse shift rod 78 slips rightwards (FIG. 1). At the same time, the drive cam face d for reverse shift of the drive cam 88 which operates integrally with the fifth speed–reverse shift rod 78 presses against the driven cam face a for reverse shift of the reverse shift fork 50, swinging the reverse shift fork 50 anticlockwise. As a result, the reverse shift fork 50 slides the reverse idle gear 41 leftwards along the reverse idle shaft Sr, and the reverse idle gear 41 meshes with the main reverse gear 42 and the counter reverse gear 43 to establish a reverse gear shift stage.

In this state, the left end face of the reverse idle gear 41 is in contact with the end face 12b of the case left half 12, and even if the reverse idle gear 41 attempts to move rightwards therefrom, the rightward movement of the reverse idle gear 41 is prevented by the contact between the drive cam face d for reverse shift of the drive cam 88 and the driven cam face a for reverse shift of the reverse shift fork 50.

When the fifth speed–reverse shift rod 78 moves leftwards from the reverse position (FIG. 12) to the neutral position (FIG. 10) in order to release an established reverse gear shift stage, the drive cam face e for neutral return of the drive cam 88 presses against the driven cam face b for neutral return of the reverse shift fork 50, swinging the reverse shift fork 50 clockwise. As a result, the reverse shift fork 50 slides the reverse idle gear 41 rightwards along the reverse idle shaft Sr, and the reverse idle gear 41 moves away from the main reverse gear 42 and the counter reverse gear 43 to release the established reverse gear shift stage.

Figure 13:
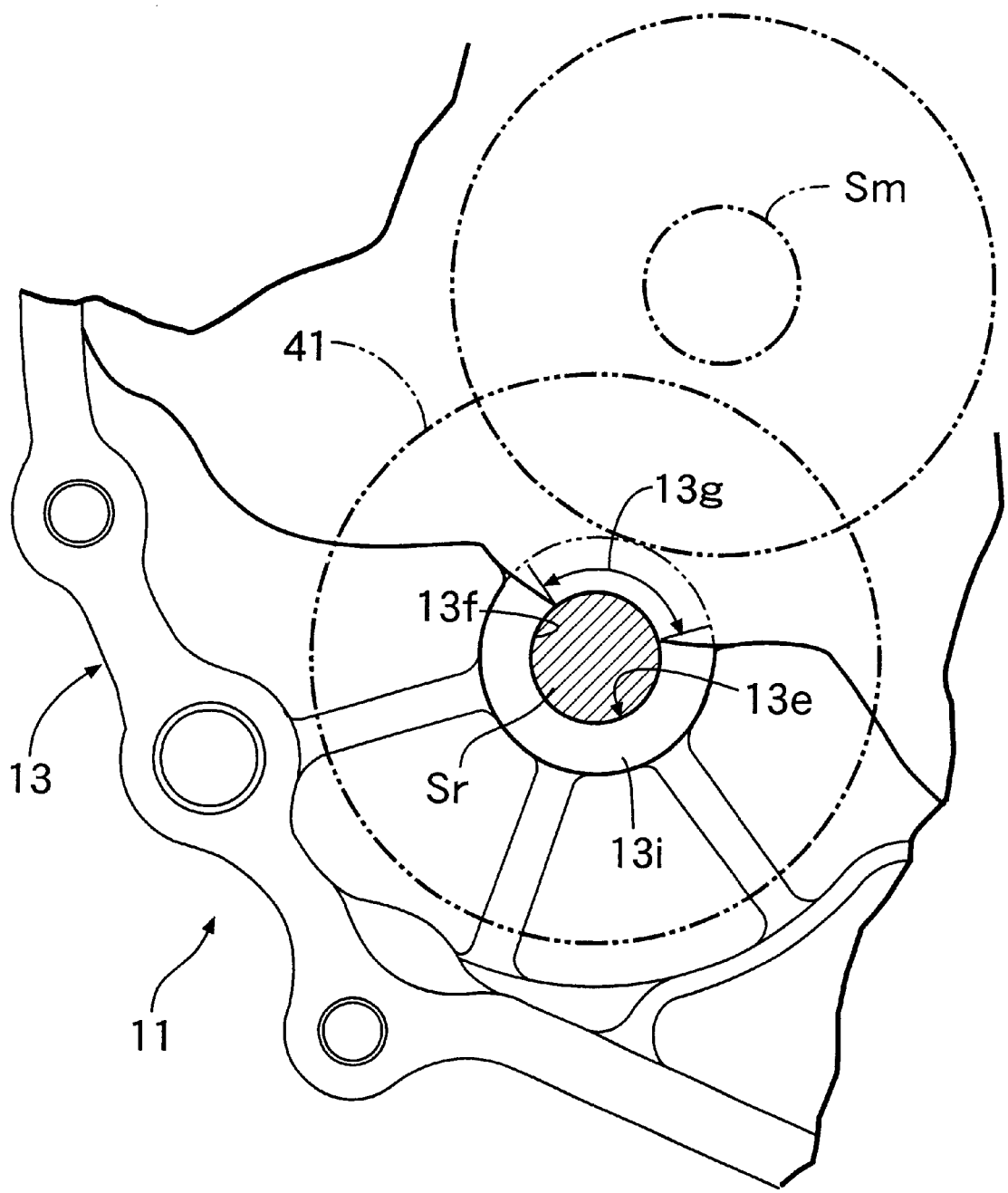
FIG. 13 is a view from line 13—13 in FIG. 10.

As is clear from FIG. 10 and FIG. 13, with regard to the reverse idle shaft Sr, its left end is held by being fitted in a shaft support hole 12a which is formed in the case left half 12 and its right end is held by being fitted in a shaft support hole 13e which is formed in the case right half 13. The inner wall surface of the shaft support hole 13e of the case right half 13 is not closed in the circumferential direction, and a portion thereof opens in the direction facing the main shaft Sm via a notch. That is to say, a shaft support surface 13f of the shaft support hole 13e which supports the reverse idle shaft Sr comprises a major arc having an angle of about 250°, and a portion of the outer circumference of the reverse idle shaft Sr is exposed to the internal space of the case right half 13 through an opening 13g comprising a minor arc having an angle of about 110°. Thus, even when a portion of the inner wall surface of the shaft support hole 13e is lacking, if the shaft support surface 13f of the shaft support hole 13e has a central angle of 180° or more, there is no possibility of the reverse idle shaft Sr dropping from the shaft support hole 13e.

As shown by the broken line in FIG. 8, if the shaft support hole 13e is made in the form of a closed pocket, since an inner wall surface 13h of the case right half 13 projects into the inside of the transmission case 11, there is a possibility of the inner wall surface 13h interfering with a gear provided on the main shaft Sm, and if the distance between the reverse idle shaft Sr and the main shaft Sm is increased in order to avoid the interference, there is the problem that the size of the transmission case 11 increases. However, by cutting a portion of the shaft support hole 13e for the reverse idle shaft Sr as in the present embodiment, the size of the transmission case 11 can be reduced by allowing the reverse idle shaft Sr to approach the main shaft Sm as closely as possible without providing a special member for supporting the reverse idle shaft Sr or carrying out special processing.

Although a manual transmission M is illustrated in the embodiment, the present invention can be applied to an automatic transmission in which the shift/select operation is carried out by an actuator.

The present invention may be embodied in other specific forms without departing from the spirit or essential characteristics thereof. The presently disclosed embodiment is therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A breather system for a transmission including a transmission case, a plurality of shift forks, a shift select shaft, a shift lever, and a select spring, for selectively establishing a plurality of gear shift stages wherein the shift forks are operated by the shift select shaft supported on the transmission case, the shift select shaft being moved in the axial direction according to a select operation of the shift lever and being moved in a circular manner according to a shift operation of the shift lever, the breather system having a subassembly comprising the shift select shaft, the select spring for biasing the shift select shaft towards a neutral position, and a cover member coupled to the transmission case such that a breather chamber is formed between the cover member and an indentation formed in the transmission case, wherein the shift select shaft passes through an opening formed in the bottom wall of the indentation and wherein the select spring is housed in the breather chamber.

2. A breather system for a transmission according to claim 1, wherein a spring seat for supporting one end of the select spring is supported on the bottom wall of the indentation, and the breather chamber is connected through to the internal space of the transmission case by a through hole formed between the outer circumference of the spring seat and the inner circumference of the opening.

* * * * *